H. L. MORRIS & G. B. NIXON.
COMBINED CIRCUIT BREAKER AND ALARM SWITCH.
APPLICATION FILED JAN. 8, 1918.
1,280,522.
Patented Oct. 1, 1918.
3 SHEETS—SHEET 1.
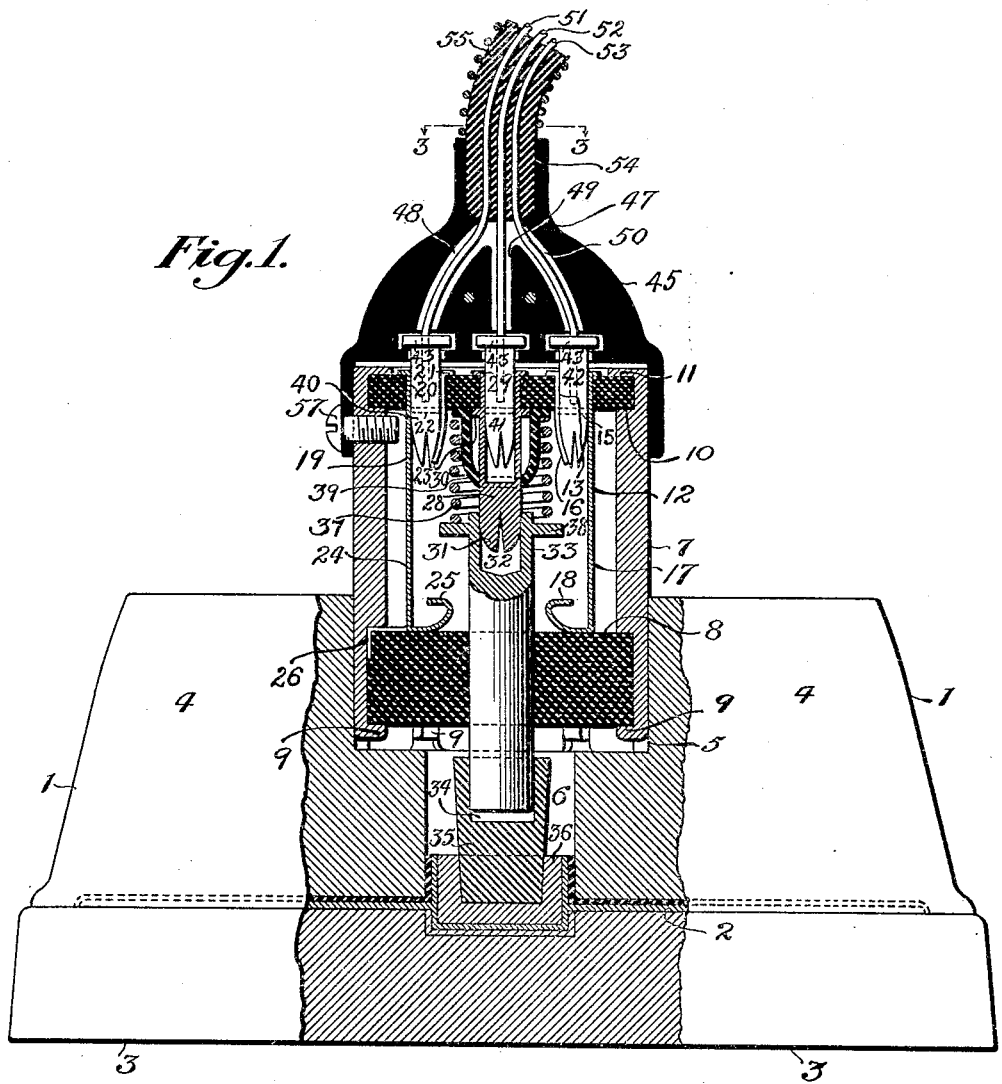
Fig. 1.
Fig. 2.
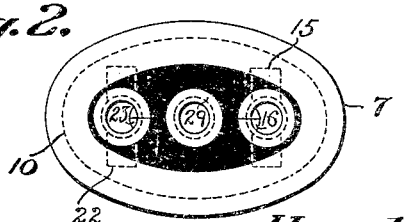
Witnesses,
Eugene A. Holland
M. A. Inglar
Inventors,
Harold L. Morris,
Gertrude B. Nixon,
By Joshua R. H. Potts
their Attorney.

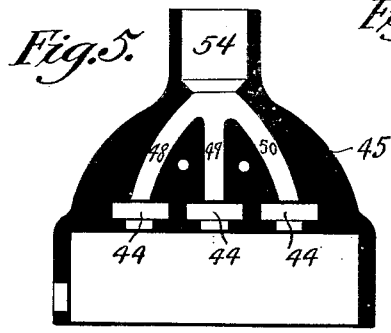
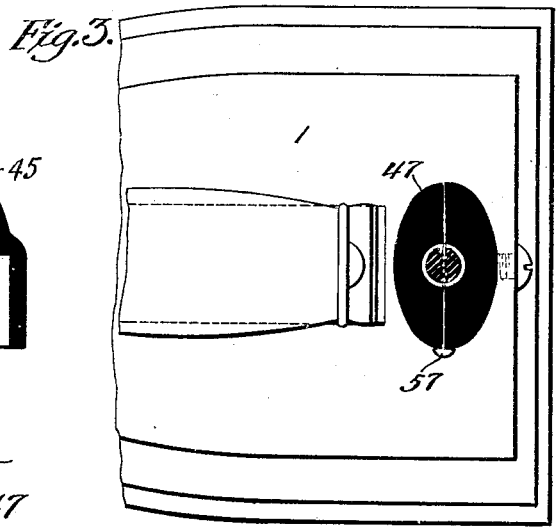
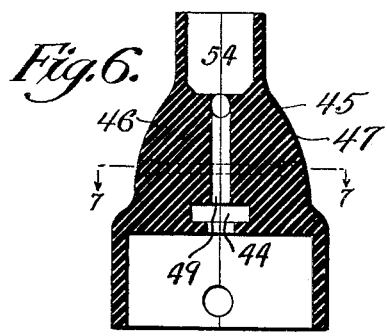
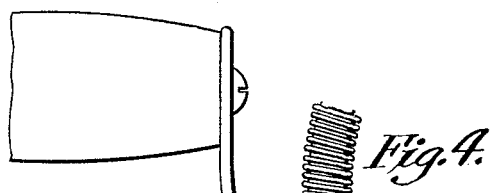
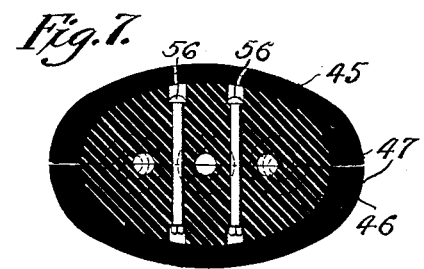
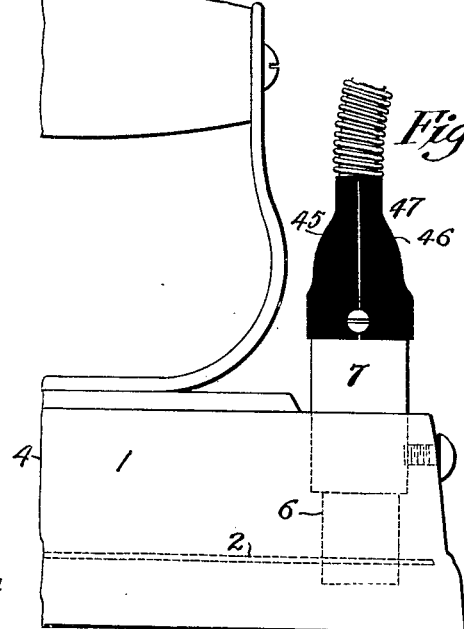

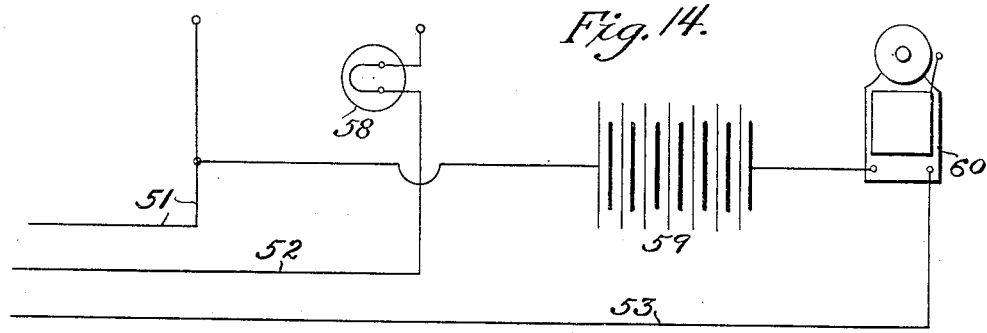
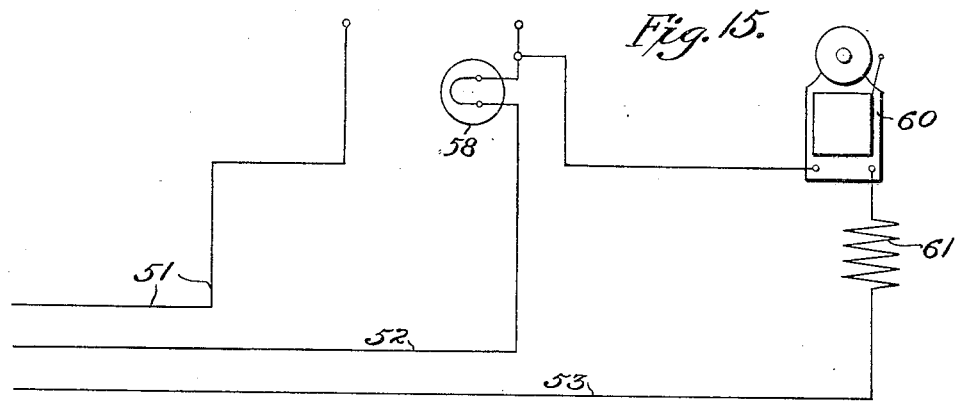
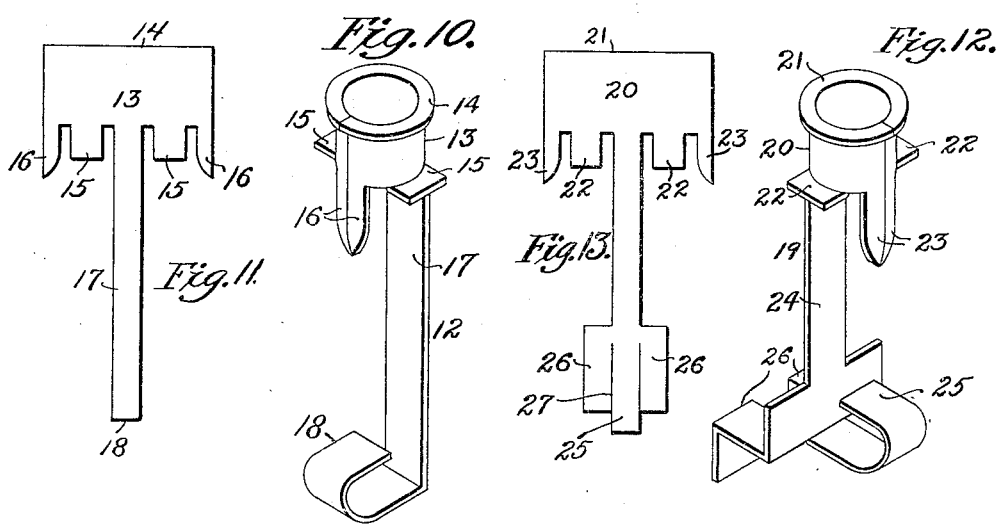

UNITED STATES PATENT OFFICE.

GERTRUDE BABB NIXON, OF BRYN MAWR, AND HAROLD LEE MORRIS, OF WAYNE, PENNSYLVANIA.

COMBINED CIRCUIT-BREAKER AND ALARM-SWITCH.

1,280,522.  Specification of Letters Patent.  Patented Oct. 1, 1918.

Application filed January 8, 1918. Serial No. 210,807.

*To all whom it may concern:*

Be it known that we, GERTRUDE BABB NIXON and HAROLD LEE MORRIS, citizens of the United States, residing at Bryn Mawr, county of Delaware, and State of Pennsylvania, and Wayne, county of Delaware, and State of Pennsylvania, have invented certain new and useful Improvements in Combined Circuit-Breakers and Alarm-Switches, of which the following is a specification.

One object of our invention is to provide means which will be particularly adapted for use in connection with electrically heated devices and which will be operative to prevent overheating of said devices.

Another object is to so construct our invention that it will be automatically operative to stop the flow of electric current to said devices and to operate an alarm thereby giving notice that the device to which the invention is attached is overheated and needs attention.

A further object is to so construct our invention that it will be durable, of simple construction, and can be easily attached to electrically heated devices of various descriptions.

A still further object is to so make our invention that the parts can be readily assembled and removed and will be so arranged and designed as to insure good electric connections.

These objects, and other advantageous ends which will be described hereinafter, we attain in the following manner, reference being had to the accompanying drawings in which Figure 1 is an enlarged sectional elevation of our invention applied to an electrically heated pressing or sad iron, a portion of said iron being illustrated in outside view, Fig. 2 is a top plan view of our invention with its cap removed and detached from the iron, Fig. 3 is a sectional plan view taken on the line 3—3 of Fig. 1 and drawn on a smaller scale; the front portion of the sad iron being broken away, Fig. 4 is a side elevation of Fig. 3, Fig. 5 is an inside elevation of one of two sections constituting a cap which forms a part of our invention, Fig. 6 is a sectional elevation of said cap showing the two sections of the cap joined together, Fig. 7 is a section on the line 7—7 of Fig. 6, Fig. 8 is a front elevation of a link which forms a part of our invention and which is made of fusible material, such as solder, which will melt at a predetermined temperature, Fig. 9 is a top plan view of Fig. 8, Fig. 10 is a perspective view of an electric contact socket which forms a part of our invention, Fig. 11 is a face view of a blank of sheet metal which is cut or stamped so that it can be readily bent to form the socket illustrated in Fig. 10, Fig. 12 is a perspective view of another electric contact socket which forms a part of our invention, Fig. 13 is a face view of a blank of sheet metal which is cut or stamped so that it can be readily bent to form the socket illustrated in Fig. 12, Fig. 14 is a wiring diagram illustrative of the wires used for conveying the current to the iron and also including a battery or generator in circuit with an electric lamp and bell; the two latter elements being affected through the medium of our invention when the temperature of the iron reaches a predetermined degree, and Fig. 15 is a wiring diagram illustrative of the wires used for conveying the current to the iron and also including an electric lamp and bell, the arrangement being such that the lamp and bell will be operated by the same current which is employed to heat the iron, resistance being included in the circuit with the bell which is sufficient to reduce the current to the proper capacity of the bell.

Referring to the drawings, 1 represents a sad iron which includes a heating element 2 which is interposed between the bottom section 3 of the iron and the top section 4. This heating element 2 can be made of any of the usual constructions whereby when electric current is passed therethrough it will serve to heat the bottom section 3 for the purpose desired. The contact section 1 has a recess 5 extending downwardly from its top and a cavity 6 depends from said recess for a purpose hereinafter described.

A metallic shell 7, preferably made elliptical in cross section, is designed to snugly fit the recess 5 and its inner surface adjacent the bottom is grooved to receive a block 8 of insulating material which, in the present instance, is illustrated as being made of layers of mica. The bottom edge of the shell 7 is provided with lips 9 which can be easily bent inwardly so as to engage the lower surface of the insulating block 8 and firmly hold the latter within the shell 7.

The top of the shell 7 is also grooved to receive a block 10 of insulating material which, in the present instance, is made of mica layers in a laminated form, as described in connection with the block 8. The extreme top edge of the shell 7 has a flange 11 which firmly binds and holds the block 10 in place. An electrical contact socket 12 which is made by bending a single piece of sheet metal, as shown in Fig. 11, has a cylindrical upper portion 13 designed to extend through a hole in the block 10.

A flange 14 is provided at the top of the cylindrical portion and engages the upper surface of the insulating block 10. The lower edge of the cylindrical portion 13 has two ears 15 which are so spaced from the flange 14 as to firmly engage the lower surface of the block 10, thus securing the socket 12 to the block 10.

Tongues 16 depend from the cylindrical portion 13 and are oppositely disposed to a depending extension 17 which at its lower end has an upturned inwardly extending hook 18 (see Figs. 1 and 10). This hook 18 is adapted to rest on the upper surface of the insulating block 8 so as to be held in position for completing an electric circuit, as will hereinafter be described. The tongues 16 are normally curved toward the extension 17 to provide a resilient bearing for a current-conducting member, hereinafter described.

A second electrical contact socket 19, which is made by bending a single piece of sheet metal, as shown in Fig. 13, has a cylindrical upper portion 20 designed to extend through another hole in the block 10. A flange 21 is provided at the top of the cylindrical portion 20 and engages the upper surface of the insulating block 10. The lower edge of the cylindrical portion 20 has two ears 22 which are so spaced from the flange 21 as to firmly engage the lower surface of the block 10, thus securing the socket 19 to the block 10. Tongues 23 depend from the cylindrical portion 20 and are oppositely disposed to a depending extension 24 which at its lower end has an upturned inwardly extending hook 25. The lower end of the extension 24 is also provided with two L-shape fingers 26 which are provided by and formed integral with the sheet metal, as shown in Fig. 13, said fingers being produced by splitting the sheet metal, as shown at 27, at either side of the portion which provides the hook 25.

The fingers 26 are adapted to rest upon the upper surface of the insulating block 8 and to contact with the portion of said metallic shell 7 which provides the groove for the insertion of the block 8. In other words the fingers 26, by being made L-shape, are angular and fit within the corner of the lower groove in the shell 7, as clearly shown in Fig. 1, thus insuring a good contact with the shell 7.

A plug 28 extends through a hole in the block 10 and has upper and lower flanges 29 and 30 adapted to respectively engage the upper and lower surfaces of the block 10 and thereby secure the plug to the block 10. The plug 28 is made hollow and has a bifurcated lower end 31 which is adapted to fit within a recess 32 in the top of a metallic plunger 33. The lower end of the plunger 33 snugly fits within a recess 34 of a link 35 which is made of metal which fuses or melts at a comparatively low temperature. This link 35 snugly fits within a metallic cup 36 which in turn is in contact with the heating element 2.

A coil spring 37 is interposed between the top of a flange 38 on the plunger 33 and the flange of a nipple 39, the latter being preferably made of insulating material and depending from the lower surface of the block 10. The nipple 39 serves as a guiding and positioning means for the spring 37 and the spring 37 tends to move the plunger 33 downwardly through a hole in the block 8. Under normal conditions the action of the spring 37 is resisted by the fusible link 35. However, when a certain temperature is reached, as will hereinafter be more fully described, the link 35 will melt and the spring 37 will act to move the plunger downwardly so that the flange 38 will engage the hooks 18 and 25 and the plug 28 will be detached from the plunger.

Three contact plugs 40, 41, and 42 have tapered lower ends which are bifurcated and at their upper ends are provided with flanges 43 adapted to fit within recesses 44 jointly produced by two sections 45 and 46 of a cap 47, said cap being made of insulating material and provided with three communicating channels 48, 49, and 50 through which wires 51, 52, and 53 pass. These wires are attached to the respective contact plugs 40, 41, and 42. The contact plugs 40 and 42 are adapted to fit within the electric contact sockets 19 and 12, respectively. The contact plug 41 is adapted to fit within the plug 28.

The top of the cap 47 is recessed at 54 to receive a flexible cable 55 which includes the wires 51, 52, and 53, above mentioned. The sections 45 and 46 of the cap 47 are held together by two screw bolts 56, and the cap thus united is secured to the shell 7 by means of a screw 57.

Considering the above mentioned elements in connection with the wiring diagram illustrated in Fig. 14, the heating current is supplied through the wires 51 and 52, said current passing through an electric lamp 58, contact plug 41, plug 28, plunger 33, link 35, cup 36, heating element 2, iron 1, shell 7, electric contact socket 19, plug 40, and wire 51 to complete the circuit.

Should the iron become too hot or after it has reached a predetermined temperature, the link 35 will melt and the spring 37 will move the plunger 33 out of contact with the plug 28 and the flange 38 into contact with the hooks 25 and 18. Immediately upon the separation of the plunger 33 from the plug 38, the circuit will be broken in the wires 51 and 52. However, the flange 38, being metallic, will complete the circuit, through the medium of the hooks 25 and 18, in the wires 51 and 53. These wires are connected with a battery 59 and an electric bell 60. The battery 59 will therefore generate current to ring the bell 60, it being noted that upon the breaking of the circuit in the wires 51 and 52, the lamp 58 will be extinguished and thus give an additional alarm.

In the wiring connection, illustrated in Fig. 15, the bell 60 is connected with the wire 52 instead of wire 51 and a resistance 61 is interposed between the bell 60 and the wire 53, thus when the circuit between the plug 28 and plunger 33 is broken, as above described, the heating current will actuate the bell and the resulting conditions are similar to those described in connection with Fig. 14 with the exception that the extra battery 59 is dispensed with and in lieu thereof a resistance is required on electric bells of ordinary capacity.

Thus by our invention it is impossible for the iron or other electrically heated utensil or device to which our invention is applied, to become dangerously overheated.

By providing the contact sockets 12 and 19 with the tongues 16 and 23 which are bent or curved inwardly, as above described, the electric contacts are held under a slight tension due to the fact that the inserting movement of said contacts tends to deflect the tongues. Furthermore, this tension is also increased by the fact of the parting which extends between the tongues on each socket since the contacts serve to spread the cylindrical portions and thereby provide a tight fit for the contacts. Thus a good electrical connection is provided. The bifurcated ends of the contacts also serve to provide tension between the contacts and the sockets since they will be slightly squeezed together during the inserting movement.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:

1. The combination of a device having a heating element connected thereto; means adapted to be connected to said device; current-conducting members carried by said means; and means interposed between said heating element and one of said members and normally holding said members together, said interposed means being made of material which melts at a predetermined temperature and thereby permits said members to separate, substantially as described.

2. The combination of a device having a heating element connected thereto and a cavity; means adapted to be connected to said device; current-conducting members carried by said means; and means positioned within said cavity and interposed between said heating element and one of said members and normally holding said members together, said interposed means being made of material which melts at a predetermined temperature and thereby permits said members to separate, substantially as described.

3. The combination of a device having a heating element and a recess; means adapted to removably fit within said recess; current-conducting members carried by said means and having portions slidably fitting each other; and means interposed between said heating element and one of said members and normally holding said members together when said first means is positioned within the recess, said interposed means being made of material which melts at a predetermined temperature and thereby permits said members to separate, substantially as described.

4. The combination of a metallic device having a heating element and a recess; a metallic shell adapted to fit within said recess; two current conducting-members slidably fitting each other; insulating means supported by said shell and serving as retaining means for said current-conducting members; metallic means adapted to melt at a predetermined temperature and designed to be interposed between one of said current-conducting members and said heating element, said latter means normally serving to hold said current-conducting members in contact with each other; and means in electrical connection with said shell for completing the electric circuit, substantially as described.

5. The combination of a metallic device having a heating element and a recess; a metallic shell adapted to fit within said recess; two current-conducting members slidably fitting each other within said shell; insulating means supported by said shell and serving as retaining means for said current-conducting members; metallic means adapted to melt at a predetermined temperature and designed to be interposed between one of said current-conducting members and said heating element, said latter means normally serving to hold said current-conducting members in contact with each other; and means in electrical connection with said shell for completing the electric circuit, substantially as described.

6. The combination of a metallic device having a heating element and a cavity; a metallic shell adapted to be connected to said device; two current-conducting members slidably fitting each other; insulating means supported by said shell and serving as retaining means for said current-conducting members; metallic means located within said cavity and adapted to melt at a comparatively low temperature and designed to be interposed between one of said current-conducting members and said heating element, said latter means normally serving to hold said current-conducting members in contact with each other; and means in electrical connection with said shell for completing the electric circuit, substantially as described.

7. The combination of a metallic device having a heating element and a cavity; a metallic shell adapted to be connected to said device; two current-conducting members slidably fitting each other within said shell; insulating means supported by said shell and serving as retaining means for said current-conducting members; metallic means located within said cavity and adapted to melt at a predetermined temperature and designed to be interposed between one of said current-conducting members and said heating element, said latter means normally serving to hold said current-conducting members in contact with each other; and means in electrical connection with said shell for completing the electric circuit, substantially as described.

8. The combination of a metallic device having a heating element and a cavity; a metallic shell adapted to be connected to said device; two current-conducting members slidably fitting each other within said shell; insulating means supported by said shell and serving as retaining means for said current-conducting members; metallic means located within said cavity and adapted to melt at a predetermined temperature and designed to be interposed between one of said current-conducting members and said heating element, said latter means normally serving to hold said current-conducting members in contact with each other; a third current-conducting member in electrical connection with said shell for completing the electric circuit; a fourth current-conducting member insulated from said shell; and an electrically operated alarm in electrical connection with said fourth current-conducting member, one of said first two current-conducting members when separated from the other serving to engage and thereby complete an electric circuit through said alarm to actuate the same, substantially as described.

9. The combination of a device having a heating element and a recess; means adapted to removably fit said recess; current-conducting members carried by said means and having portions slidably fitting each other within said means; and means interposed between said heating element and one of said members and normally holding said members together when said first means is positioned within the recess, said interposed means being made of material which melts at a predetermined temperature and thereby permits said members to separate, substantially as described.

In testimony whereof we have signed our names to this specification in the presence of two subscribing witnesses.

GERTRUDE BABB NIXON.
HAROLD LEE MORRIS.

Witnesses:
JULIA MORTIMER BABB,
ELIZABETH BABB.

Copies of this patent may be obtained for five cents each, by addressing the "Commissioner of Patents, Washington, D. C."